United States Patent [19]

Hosaka

[11] Patent Number: 5,196,666

[45] Date of Patent: Mar. 23, 1993

[54] ARM SEALING DEVICE FOR AN EDM MACHINE

[75] Inventor: Akio Hosaka, Fukui, Japan

[73] Assignee: Sodick Co., Ltd., Yokohama, Japan

[21] Appl. No.: 769,777

[22] Filed: Oct. 2, 1991

[30] Foreign Application Priority Data

Oct. 3, 1990 [JP] Japan .................. 2-265619

[51] Int. Cl.$^5$ ................ B23H 7/02; B23H 7/36
[52] U.S. Cl. .................. 219/69.12; 219/69.14
[58] Field of Search .......... 219/69.12, 69.14, 69.11

[56] References Cited

U.S. PATENT DOCUMENTS

| 4,565,915 | 1/1986 | Girardin | 219/69.12 |
| 4,647,747 | 3/1987 | Goto | 219/69.12 |
| 4,808,786 | 2/1989 | Shinkai et al. | 219/69.12 |
| 4,918,279 | 4/1990 | Babel et al. | 219/69.12 |
| 4,992,640 | 2/1991 | Tanaka et al. | 219/69.12 |
| 5,028,757 | 7/1991 | Aramaki et al. | 219/69.12 |

FOREIGN PATENT DOCUMENTS

| 57-89524 | 6/1982 | Japan | 219/69.12 |
| 047022 | 2/1984 | Japan . | |
| 249218 | 4/1985 | Japan . | |
| 249219 | 4/1985 | Japan . | |
| 271629 | 5/1986 | Japan . | |
| 065922 | 1/1988 | Japan . | |
| 63-28514 | 2/1988 | Japan | 219/69.14 |
| 205921 | 2/1988 | Japan . | |
| 306130 | 5/1988 | Japan . | |
| 321122 | 6/1988 | Japan . | |
| 63-306827 | 12/1988 | Japan . | |
| 1-264721 | 10/1989 | Japan . | |
| 1-321122 | 12/1989 | Japan | 219/69.12 |

Primary Examiner—Geoffrey S. Evans
Attorney, Agent, or Firm—Marks & Murase

[57] ABSTRACT

A wire-cut electric discharging machine comprises a processing tank with an opening in one wall for the insertion of the lower arm unit. The lower arm unit is enclosed by a cylindrical pipe. The opening in the wall of the tank is sealed by a slide plate which moves in a direction parallel to the wall of the tank. Bellows interconnect the slide plate to the pipe 10 thereby providing a seal between the slide plate and pipe. The bellows expand and contract thereby allowing the processing tank to move along the axis of the lower arm unit while still providing a seal. Machining fluid flows through the pipe and around the lower arm unit. The fluid maintains the temperature of the lower arm unit at a constant value. The pipe protects the lower arm unit from being directly affected by the hydraulic pressure in the tank and also from being affected by motion of the tank. The sealing resistance for when the processing tank moves along the axis of the lower arm unit is significantly reduced.

5 Claims, 3 Drawing Sheets

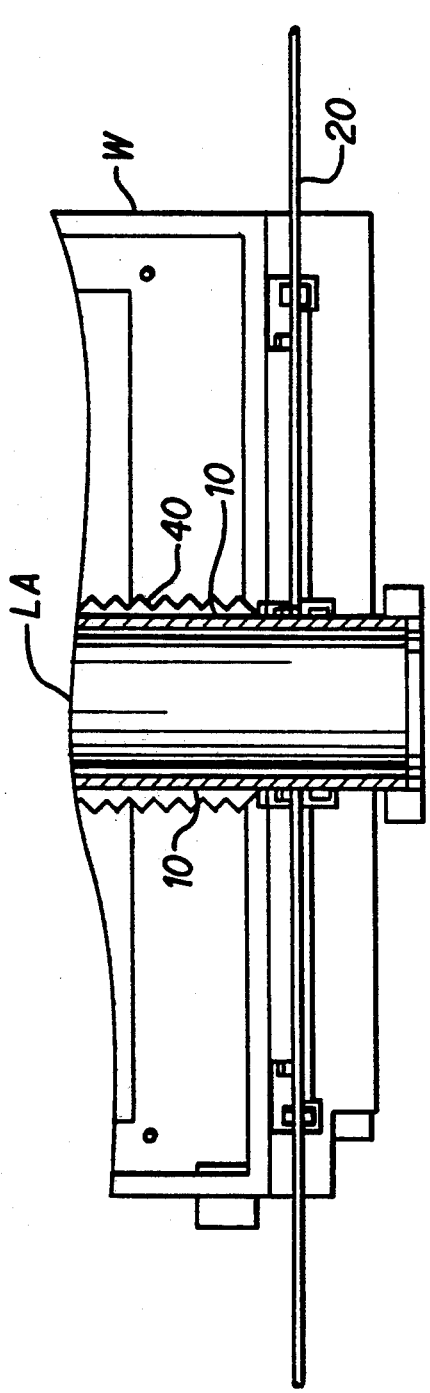
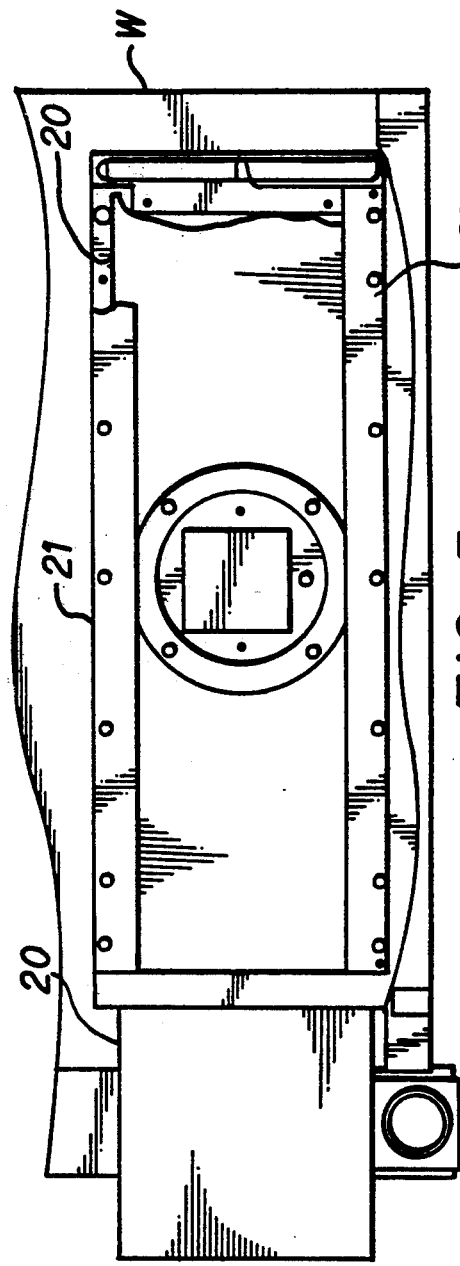
FIG. 4
FIG. 5

ARM SEALING DEVICE FOR AN EDM MACHINE

FIELD OF THE INVENTION

This invention generally relates to a wire-cut electrical discharge machining apparatus ("EDM"). More specifically, this invention relates to an apparatus for sealing the lower arm unit in a wire-cut EDM machine which performs submerged machining.

DISCUSSION OF BACKGROUND

In a wire-cut EDM machine which performs submerged machining, various methods have been proposed for sealing the lower arm unit with the processing tank. For example, as disclosed in U.S. Pat. No. 4,918,279, a slide seal may seal the arm unit when the arm unit moves axially. In such machines, however, particles produced during machining of the workpiece disperse throughout the working fluid and may become deposited onto the arm unit. As a result of these particles, the slide seal may become worn and the sliding resistance of the arm unit varies significantly.

In Japanese Patent Publication 63-306827, an EDM machine is disclosed which has bellows directly connected to the arm unit to seal against axial movement of the arm unit. During machining of a workpiece, the bellows are exposed to the hydraulic pressure of the working fluid. This hydraulic pressure is also applied to the lower arm unit which may cause the lower arm unit to deform.

U.S. Pat. No. 4,992,640 issued to Tanaka, et al. also discloses the use of bellows. These bellows are connected at one end to a shielding plate and at the other end to the column. The lower arm unit is directly exposed to the hydraulic pressure inside the processing tank.

Additionally, such EDM machines may be prone to errors caused from varying temperatures. The temperature inside the processing tank is maintained at a fixed level by controlling the temperature of the working fluid. Portions of the lower arm unit outside of the processing tank, however, would be exposed to the external temperature. Because of the temperature differential, the lower arm unit may expand and cause an error of a few micrometers in the direction. Since the arm's length is about 300 mm-600 mm, a change of 1 degree C. would cause a significant thermal displacement in the axial direction.

SUMMARY OF THE INVENTION

It is an object of the present invention to provide an EDM machine which has a processing tank movable with respect to a lower arm unit in a sealing relationship.

It is an object of the present invention to provide a lower arm unit which is exposed to a constant temperature.

It is a further object of the present invention to provide a sealing arrangement which produces a low sliding resistance to the lower arm unit during movement of the processing tank.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects in accordance with the purpose of the present invention, as embodied and broadly described herein, the arm sealing device of this invention may comprise a processing tank having an opening in it which is covered by a slide plate having an opening through which a pipe containing the arm unit passes. Bellows extend from the slide plate to the inserted end of the pipe to provide a seal between the slide plate and the pipe. Machining fluid flows between the pipe and arm unit for maintaining the arm unit at a constant temperature.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 4 is a partial cross-sectional view from the top of the tank;

FIG. 5 shows a partial side view of the sealing arrangement.

DETAILED DESCRIPTION OF THE PREFERRED EMBODIMENTS

Reference will now be made in detail to the present preferred embodiment of the invention, an example of which is illustrated in the accompanying drawings.

Figure 1:
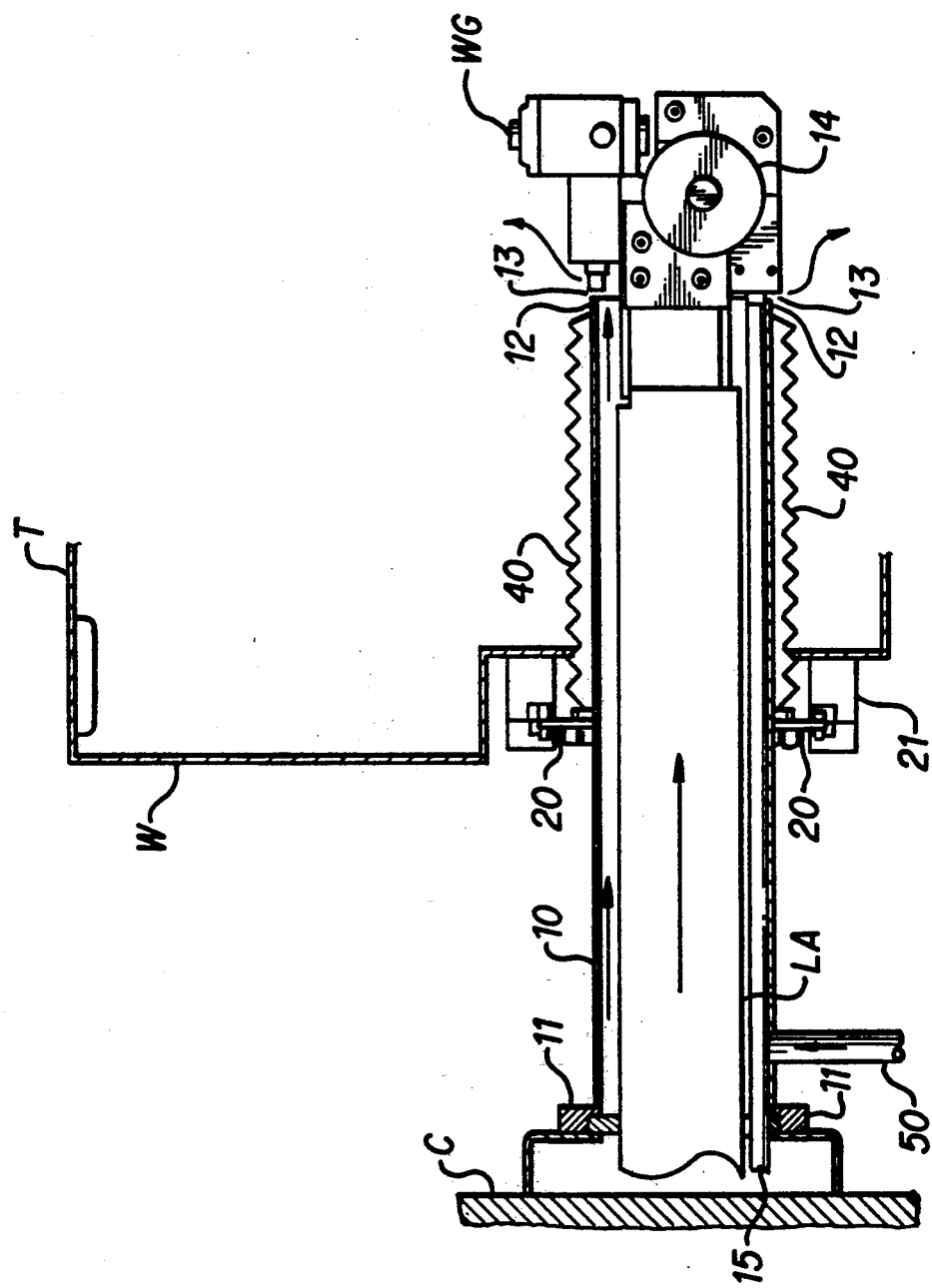
FIG. 1 is a longitudinal front view of an embodiment of the invention.
Figure 2:
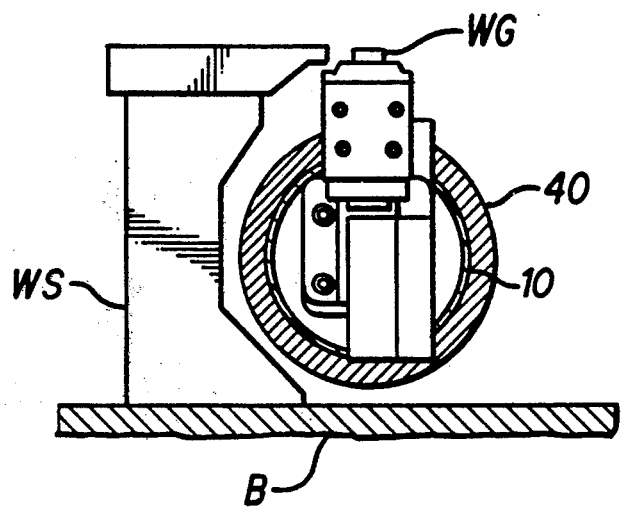
FIG. 2 is a side view of key sections shown in FIG. 1.

In the embodiment shown in FIGS. 1 and 2, an opening is provided in wall W of processing tank T. The tank T contains machining fluid for performing submerged electric discharge machining. A wire electrode extends from an upper arm unit, not shown, to a wire guide unit WG, pulley 14, and out through conduit 15 of a lower arm unit LA. The lower arm unit LA is attached to a column C. A cylindrical pipe 10 encloses the lower arm unit LA and is preferably coaxial with the lower arm unit LA.

Machining fluid circulates in a space between the lower arm unit LA and the pipe 10. The machining fluid is supplied from a working fluid circulation pipe 50, shown in FIG. 1 at the left end near flange 11 of the lower arm unit LA. The machining fluid then travels along the lower arm unit LA to the right end 12 of the lower arm unit and out through a clearance 13 between the pipe 10 and the lower arm unit LA and into the tank T.

A slide plate 20 is connected to the frame 21, which is supported by the processing tank T. The slide plate 20 is preferably disposed parallel to the wall W of the tank T and has an opening in the center for the insertion of the pipe 10 and lower arm unit LA. As shown in FIG. 2, a work stand WS is preferably provided on a table B.

Figure 3:
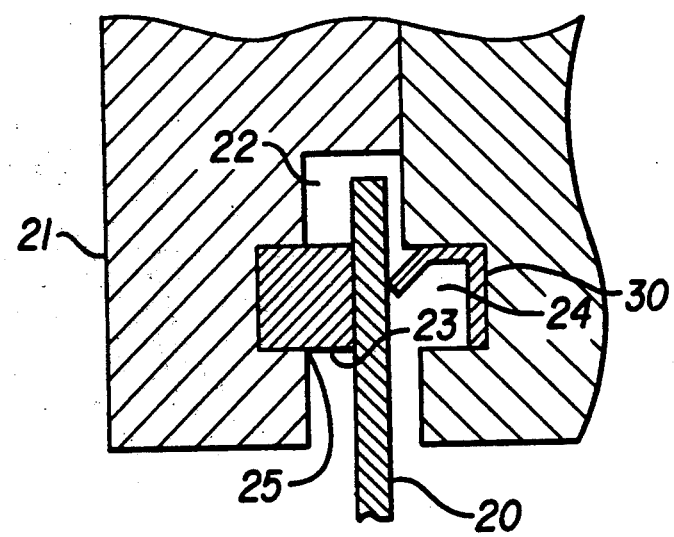
FIG. 3 is a an enlarged view of the seal between the slide plate and the tank.

As best seen in FIG. 3, the slide plate 20 is positioned in a groove 22 formed in the frame 21. On one side the slide plate 20 contacts a slide plate holding member 25, which is formed in a recessed portion 23 inside the groove 22, and on the other side by a slide seal 30, formed in a recessed portion 24. Preferably, the slide seal 30 comprises a low-friction material, such as Teflon ®, and acts to bias the slide plate 20 against the slide plate holding member 25. With such an arrangement, the opening formed in the wall W of the tank T is sealed even when the tank T moves from side to side along the direction of the wall W.

As best seen in FIGS. 1 and 4, bellows 40 are connected to the slide plate 20 at one end and to the pipe 10 at the other end. The bellows 40 extend inside the processing tank T and seal the space between the slide plate 20 and the pipe 10.

FIG. 5 illustrates a cut-away front view of the sealing arrangement. In this view, the column has been removed from the figure.

For positioning the workpiece relative to the wire electrode during electric discharge machining, the processing tank T moves while the lower arm unit LA remains fixed. When the processing tank T moves in a direction perpendicular to the axis of the lower arm unit LA, the frame 21 moves relative to the slide plate 20 while maintaining a sealing relationship therebetween.

When the processing tank T moves in a direction parallel to the axis of the lower arm unit LA, the bellows 40 provide a sealing relationship between the slide plate 20 and the pipe 10. The bellows 40 contract when the processing tank T moves in a direction away from the column C and expand when the processing tank T moves toward the column C.

During electric discharge machining of a workpiece, machining fluid is circulated from the fluid circulating pipe 50 through the pipe 10 and into the processing tank T. The fluid flows around the entire outside surface of the lower arm unit LA. As the machining fluid is preferably maintained at a constant temperature it thereby maintains the temperature of the lower arm unit LA constant too. Since the entire length of the lower arm unit LA is immersed with the fluid, thermal displacement errors are prevented.

The bellows 40 are connected to the pipe 10, rather than the lower arm unit LA. Because the bellows 40 is connected to the pipe 10, the hydraulic force pressing upon the bellows 40 does not directly affect the lower arm unit LA. Furthermore, the pipe 10 prevents the lower arm unit LA from being affected by motion of the processing tank T. Thus, the pipe 10 and bellows 40 protects the lower arm unit LA from becoming deformed or damaged.

With sealing device of the present invention, the difficulties involved with an axially sliding seal ar eliminated. For example, the sealing device of the present invention is not prone to problems caused by particles produced during electric discharge machining. Also, the present sealing device significantly reduces the sliding resistance of the arm unit. Additionally, the sealing device is not prone to the reduced life span of an axial slide seal caused by erosion.

The foregoing description of a preferred embodiment of the invention has been presented for purposes of illustration and description. It is not intended to be exhaustive or to limit the invention to the precise form disclosed, and obviously, many modifications and variations are possible in light of the above teaching. The embodiment was chosen and described in order to best explain the principles of the invention and its practical application to thereby enable others skilled in the art to best utilize the invention and various embodiments and with various modifications as are suited to the particular use contemplated. It is intended that the scope of the invention be defined by the claims appended hereto.

We claim:

1. A wire-cut electric discharge machining apparatus having a column for supporting a wire guide assembly and comprising:
   (a) a processing tank movable in two orthogonal directions and having at least one wall with an opening therein;
   (b) a slide plate, having a passageway therein, said slide plate being sealed to said one wall and movable along a direction parallel to said one wall;
   (c) a pipe extending through said passageway, said pipe having a first end connected to said column and a second end disposed in said tank;
   (d) an arm unit disposed inside said pipe, said arm unit having an end disposed in said tank for supporting a wire guide unit therein; and
   (e) a sealing member connecting said slide plate to said pipe, said sealing member including means operable for expanding and contracting to seal said passageway and said opening when said tank moves in one of said orthogonal directions;
   wherein machining fluid flows between said pipe and said arm unit whereby the temperature of said arm unit is maintained at a constant value.

2. The wire-cut electric discharge machining apparatus according to claim 1, wherein said one orthogonal direction is along the axis of said arm unit.

3. The wire-cut electric discharge machining apparatus according to claim 1, wherein the other of said orthogonal directions is a direction parallel to said one wall.

4. The wire-cut electric discharge machining apparatus according to claim 3, further comprising a frame unit attached to said one wall wherein said slide plate is connected to said frame unit and a slide seal is operable for sealing said slide plate to said frame unit when said slide plate moves in said direction parallel to said one wall.

5. The wire-cut electric discharge machining apparatus according to claim 4, wherein said sealing member comprises a bellows attached on one end to said slide plate and on the other end to said pipe which extends into said tank.

* * * * *